Oct. 31, 1967

E. A. RICHARDS 3,349,635

AUTOMOTIVE DEVICE

Filed June 8, 1965

INVENTOR.
ELMER A. RICHARDS

BY
Wordhams, Blanchard & Flynn
ATTORNEYS

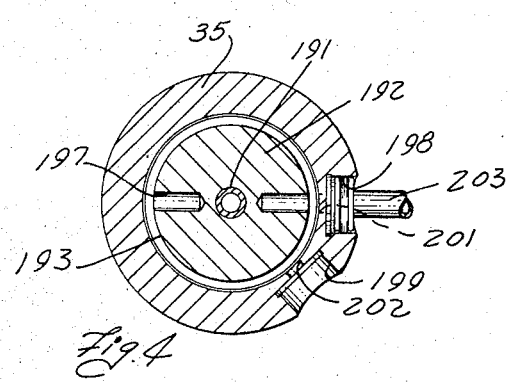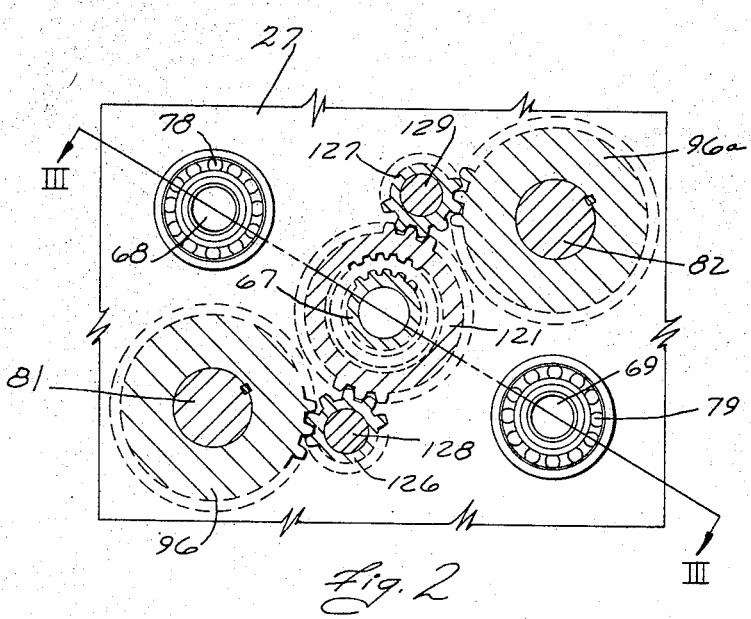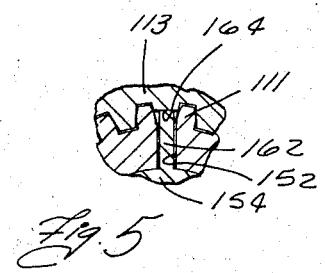

Oct. 31, 1967

E. A. RICHARDS 3,349,635

AUTOMOTIVE DEVICE

Filed June 8, 1965

INVENTOR.
ELMER A. RICHARDS
BY
*Windham, Blanchard & Flynn*
ATTORNEYS

United States Patent Office 3,349,635
Patented Oct. 31, 1967

3,349,635
AUTOMOTIVE DEVICE
Elmer A. Richards, Peoria, Ill., assignor to Eaton Yale & Towne Inc., a corporation of Ohio
Filed June 8, 1965, Ser. No. 462,377
13 Claims. (Cl. 74—331)

ABSTRACT OF THE DISCLOSURE

A ratio changing transmission having a rotatable shaft including an axial internal opening in which a piston is slidably disposed for reciprocation in response to application of fluid pressure thereto. The piston means engages suitable shifting means encircling the shaft whereby movement of the piston causes shifting of the shiftable means.

---

This invention relates to a ratio changing transmission and more particularly relates to a transmission having pressure fluid means in a shaft thereof actuable for shifting the ratio of the transmission.

The present invention was developed to fulfill a need existing in a particular type of transmission generally referred to as a stop-synchronized transmission. Stop-synchronized transmissions have been designed in the past for use in automotive vehicles to transfer power from an engine or other suitable drive source to a load, typically the drive shaft and road wheels of the vehicle. Known transmissions of this type usually include a clutch for uncoupling the transmission input shaft from the drive source and a further clutch for disconnecting the output shaft of the transmission from the load in order to unload the transmission. Moreover, a brake is normally provided on at least one of the input and output shafts of the transmission for stopping same after they have been disconnected as described above. With the shafts and gears of the transmission at rest, the shiftable elements, such as gears or toothed clutches, will, upon being shifted, mesh quickly, easily and without clashing. Since there is no difference of the peripheral speeds of the meshing elements, such being zero in all cases, meshing takes place substantially instantaneously. There is no hesitation after initiation of the shift as in transmissions of other types wherein one must wait for the speeds of the shiftable elements to equalize before the shift can be completed. Moreover, the peripheral loads on the meshing elements of the stop-synchronized transmission during shifting are negligible thereby greatly reducing wear and the probability of breakage during shifting.

However, in spite of these long recognized advantages, stop-synchronized transmissions are not widely used, apparently at least in part because of the length required by the clutches which disconnect the transmission from the engine and load and for the brake which halts the transmission components. This has caused prior stop-synchronized transmissions to have generally been of substantially greater length and weight than conventionally synchronized transmissions providing a similar torque capacity and number of gear ratios.

Such added length cannot be tolerated because, in order to meet competition and the stringent space limitations of modern automotive vehicles, the transmission manufacturer must instead maintain and, indeed, attempt to reduce, the overall size of a transmission and, particularly the axial length thereof, below tight dimensional limits without sacrificing any of the performance characteristics of the transmission. Limits imposed on the axial length of the transmission are particularly rigorous, for example, in highway trucking applications where legal limits on the overall vehicle length and desire to devote as much of that length as possible to useable cargo space sharply limits the length of the cab, engine and transmission. Despite their generally advantageous operation, stop-synchronized transmissions are not widely used, the added length of prior stop-synchronized transmissions having proven to be a substantial and apparently overriding disadvantage.

The task of shortening a transmission is made difficult since, in general, the axial length of the gear meshing faces cannot be shortened without a reduction in permissible torque load on the transmission and, similarly, the size of the shaft bearings used generally cannot be materially shortened.

Although the device embodying the invention was developed to meet the excessive axial length problem of a stop-synchronized transmission, it is contemplated that the device embodying the invention can be used in a wide variety of other types of transmissions and is by no means limited to use in a stop-synchronized transmission.

Thus, the objects of this invention include:

(1) To provide a transmission, as aforesaid, in which the overall length is reduced in comparison to prior transmissions of similar type and capacity and in which the length of shafts carrying shiftable elements such as gears or clutches is reduced by minimizing axial clearances between the adjacent gears thereon.

(2) To provide a transmission, as aforesaid, in which minimum length for a given torque carrying capacity is obtained by having adjacent gears in axial contact with each other and in which the axial length of such gear groups is substantially the sum of the axial toothed lengths thereof.

(3) To provide a transmission, as aforesaid, in which conventional clutches and synchronizers usually axially disposed between the gears are not required and are eliminated.

(4) To provide a transmission, as aforesaid, in which conventional shift forks and, hence, the axial space normally required thereby are not needed and are eliminated.

(5) To provide a transmission, as aforesaid, which is particularly adaptable to stop synchronizing as well as being capable of use with a variety of other synchronizing devices.

(6) To provide a ratio changing transmission having pressure fluid actuable means in at least one shaft thereof for shifting the transmission from one ratio to another.

(7) To provide a transmission, as aforesaid, which is economical to construct, reliable in operation, readily maintained and capable of long service life with a minimum of maintenance.

Other objects and purposes of this invention will be apparent to persons acquainted with apparatus of this general type upon reading the following specification and inspecting the accompanying drawings.

In the drawings:

FIGURE 2 is a fragmentary sectional view substantially as taken on the line II—II of FIGURE 1.

FIGURE 4 is a reduced sectional view substantially as taken on the line IV—IV of FIGURE 3.

FIGURE 5 is a fragmentary sectional view substantially taken on the line V—V of FIGURE 3.

Certain terminology will be used in the following description for convenience in reference only and will not be limiting. The words "upwardly," "downwardly,"

Figure 1:
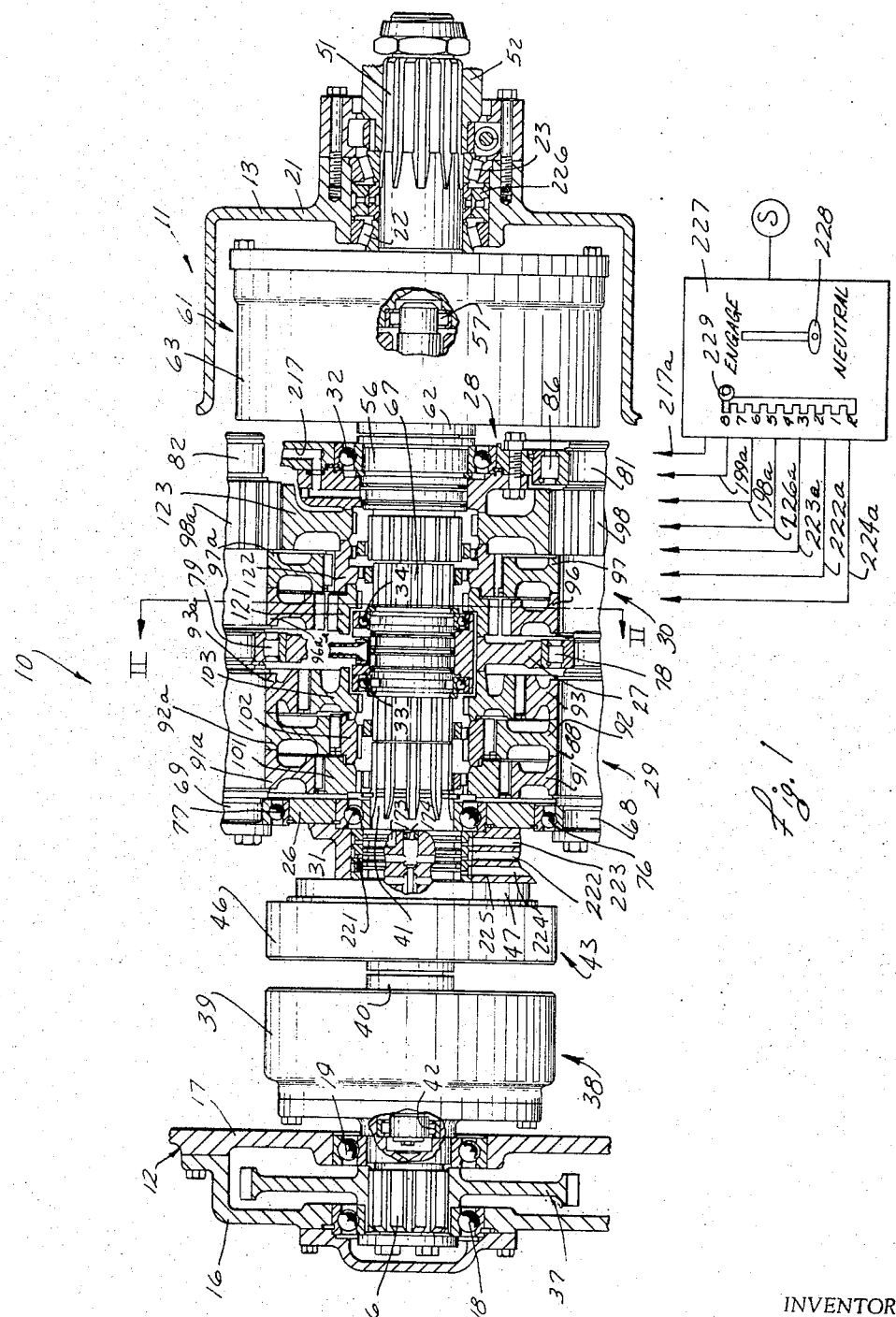
FIGURE 1 is a fragmentary, partially broken central cross-sectional view of a transmission embodying the invention.

"rightwardly" and "leftwardly" will designate directions in the drawings to which reference is made. The words "forwardly" and "rearwardly" will designate directions toward the input and output ends of the transmission, respectively, such directions being leftwardly and rightwardly, respectively as seen in FIGURES 1 and 2. The words "inwardly" and "outwardly" will refer to directions toward and away from, respectively, the geometric center of the device and designated parts thereof. Said terminology will include the words above specifically mentioned, derivatives thereof and words of similar import.

General description

In general the objects and purposes of this invention are met by providing a ratio changing transmission including a rotatable shaft. The shaft includes an axial internal opening in which a piston is slidably disposed for reciprocation in response to application of fluid pressure thereto. The piston means engages suitable shiftable means encircling the shaft whereby movement of the piston causes shifting of the shiftable means.

Detailed description

The transmission 10 (FIGURE 1) embodying the invention is shown for purposes of illustration only as a stop-synchronized transmission. It will be recognized that the invention is not limited to such type of transmission and may be used with a wide variety of other transmission types.

The transmission 10 includes a case 11, fragments of the front and rear portions 12 and 13 of which are shown in FIGURE 1. The front portion 12 includes an axially spaced pair of radially extending walls 16 and 17 which carry axially aligned bearings 18 and 19. The radial wall 21 of the rearward portion 13 carries a pair of bearings 22 and 23 in coaxial alignment with the bearings 18 and 19. The case 11 further includes a plurality, here three, of axially spaced intermediate webs 26, 27 and 28 which define gear zones 29 and 30 therebetween and are disposed between the walls 17 and 21. The webs 26 and 28 support bearings 31 and 32, respectively. The bearings 31 and 32 are coaxially aligned with the afore-mentioned bearings 18, 19, 22 and 23.

A head shaft 36 carries a gear 37 in splined engagement therewith for rotation. The drive portion 39 of a clutch 38 of any desired conventional type connects to the flanged rearward end of the head shaft 36 for rotation therewith. The bearing 18 rotatably supports the hub of the gear 37 and, together with the bearing 19, rotatably supports the head shaft 36.

An input shaft 41 lies to the rear of the head shaft 36 and is supported by the bearing 31 in coaxial alignment with said head shaft. The forward end of the input shaft 41 is preferably piloted in the rearward end of the head shaft 36 in a conventional manner by a suitable bearing 42. The input shaft 41 supports the driven portion 40 of the clutch 39, the clutch 39 being actuable by any convenient means for coupling and uncoupling the head shaft 36 to and from the input shaft 41. The input shaft 41 carries a brake 43 of any desired conventional type behind the clutch 38. The brake 43 has a portion 46 which rotates with the input shaft 41 and a stationary portion 47 which is fixed with respect to the case 11. The brake 43 is actuable in any conventional manner for stopping the rotation of the input shaft 41.

A tail shaft 51 is rotatably supported in the bearings 22 and 23 and is coaxial with the head shaft 36 and input shaft 41. The rearward end of the tail shaft 51 is engageable by any convenient means, such as splines, to any suitable power take off device such as the drive shaft 52 of a vehicle.

An output shaft 56 is supported for rotation in the bearing 32 in coaxial alignment with the tail shaft 51.

In addition, the output shaft 56 is preferably piloted in the forward end of the tail shaft 51 by a bearing 57.

A rearward clutch 61 has a drive portion 62 affixed to the output shaft 56 and a driven portion 63 which is fixed to the tail shaft 51. The clutch 61 may be of any convenient type and is alternatively energizable for coupling and uncoupling the shafts 56 and 51.

In the particular embodiment shown, an intermediate shaft 67 is provided and is disposed coaxially between the input and output shafts 41 and 56 in closely spaced axial relation thereto. Provision of the intermediate shaft 67 allows a large number of gear ratios to be achieved.

In the illustrated embodiment of the invention the input shaft 41, intermediate shaft 67 and output shaft 56 are disposed between spaced countershafts substantially in the manner disclosed in U.S. Patent No. 3,105,395, issued Oct. 1, 1963, and entitled Automotive Device. In the transmission of said U.S. Patent No. 3,105,395, the main shaft gears loosely encircle the main shaft and are radially located by engagement with corresponding gears of a surrounding pair of countershafts. It is fully contemplated, however, that the present invention may also be utilized with conventional single countershaft transmissions and in transmissions in which the main shaft gears are radially supported by the main shaft itself.

More particularly, the transmission 10 (FIGURE 1) includes a forward pair of countershafts 68 and 69 which are equally and diametrally spaced from the input shaft 41 and intermediate shaft 67. The forward ends of the countershafts 68 and 69 are rotatably supported by bearings 76 and 77 carried on the forward web 26. The rearward ends of the countershafts 68 and 69 are rotatably supported by bearings 78 and 79 carried by the intermediate web 27.

A rearward pair of countershafts 81 and 82 are equally and diametrally spaced from the intermediate shaft 67 and output shaft 56. The plane of the rearward countershafts 81 and 82 is angularly offset (FIGURE 2) from that of the forward countershafts 68 and 69 with respect to the axis of the intermediate shaft 67. The forward ends of the rear countershafts 81 and 82 are rotatably supported on the intermediate web 27 in suitable bearings, not shown, and preferably similar to the bearings 78 and 79 supporting the rearward ends of the forward countershafts. The rearward ends of the rear countershafts 81 and 82 are rotatably supported on bearings, one of which is indicated at 86, carried by the rear web 28.

A plurality of gears, here three, indicated at 91, 92 and 93 are fixed to the forward countershaft 68 by any convenient means such as a key indicated at 88. The forward countershaft 69 is similarly provided with preferably identical and radially aligned gears 91a, 92a and 93a. The rearward countershaft 81 is provided with a plurality, here three, of gears indicated at 96, 97 and 98 which are fixed for rotation therewith. In the particular embodiment shown, the gears 96 and 97 are keyed to the shaft 81 and the gear 98 is integral therewith. The rear countershaft 82 is similarly provided with preferably identical gears 96a, 97a and 98a.

A plurality, here three, of gears 101, 102 and 103 (FIGURES 1 and 3) encircle the adjacent ends of the input and intermediate shaft 41 and 67 between the webs 26 and 27. In a particular embodiment shown, the gears 101, 102 and 103 axially abut each other. In addition, the forward face of the gear 101 abuts a stop ring 104 backed by the bearing 31 and the rear face of the gear 103 abuts the web 27. Thus, axial sliding motion of the gears 101, 102 and 103 is prevented in the present embodiment while rotation thereof at different speeds is allowed. The gears 101 and 102 and 103 mesh with and in the present embodiment are radially supported by the gears 91, 91a and 92, 92a and 93, 93a, respectively. The inner surfaces of the gears 101, 102 and 103 are in the present embodiment radially spaced from the periphery of the shafts 41 and 67. Such inner surfaces are provided with clutch teeth generally indicated at 106, 107 and 108, respectively. The contacting end surfaces of the gears 101, 102 and 103 are arranged to allow small radial movements of such gears with respect to each other to the extent required by the support of said gears upon the corresponding countershaft gears.

Externally toothed annular clutches 113 and 114 (FIGURE 3) are carried on the adjacent splined end portions 111 and 112 of the input shaft 41 and intermediate shaft 67, respectively, for rotation therewith and for axial reciprocation with respect thereto. The toothed portions 106, 107 and 108 of the gears 101, 102 and 103 are axially spaced from each other to provide clearance openings 116 and 117 therebetween of width greater than the external teeth of the clutches 113 and 114, respectively, whereby the clutches cannot engage more than one gear at a time. The gears 101 and 103 are radially aligned with the shafts 41 and 67, respectively. On the other hand, the toothed portion 107 of the gear 102 is radially aligned with, or overlaps, the end portions on both of said shafts 41 and 67. The clutch 113 is axially movable on the shaft 41 for alternative engagement with the clutch teeth 106 and 107 of the gears 101 and 102, respectively. The clutch 114 is similarly axially movable on the forward end of the shaft 67 for altenative engagement with the clutch teeth 107 and 108 of the gears 102 and 103, respectively. Thus, the clutch 113 is actuable for alternatively placing the gears 101 and 102 in driving engagement with the shaft 41 and the clutch 114 is similarly actuable for alternatively engaging the gears 102 and 103 to the forward end of the shaft 67. The above-described arrangement makes possible alternative selection of any one of four ratios between the rotational speeds of the shafts 41 and 67. One of the four speed ratios is obtained by clutching the gear 101 to the shaft 41 and the gear 102 to the shaft 67, another by clutching the gear 101 to the shaft 41 and clutching the gear 103 to the shaft 67, still another by clutching the gear 102 to the shaft 41 and the gear 103 to the shaft 67 and the final one by clutching the gear 102 to both the shafts 41 and 67, this latter giving a direct drive connection between the shafts 41 and 67.

The rearward gear zone 30 is, in the present embodiment, similarly furnished with a plurality, here three, of gears 121, 122 and 123 encircling the adjacent ends of the intermediate shaft 67 and output shaft 56. The gears 121, 122 and 123 axially abut each other and the webs 27 and 28. Said gears are arranged for limited radial movement with respect to each other and loosely encircle the shafts 67 and 56. The gears 121 and 122 and 123 are supported on and mesh with the countershaft gears 96, 96a and 97, 97a, and 98, 98a, respectively.

A pair of reverse idler gears 126 and 127 (FIGURE 2) are rotatably supported on stub shafts 128 and 129 affixed to the intermediate web 27 and extending rearwardly therefrom. The idler gears 126 and 127 are diametrally arranged with respect to the axis of the shaft 67 and are radially aligned and meshed with the gear 121 for supporting same therebetween. The idler gears 126 and 127 are also in meshed engagement with the countershaft gears 96 and 96a, respectively.

The gears 121 and 123 are provided with internal clutch teeth 131 and 134 and gear 122 is provided with two axially displaced sets of internal clutch teeth 132 and 133. Externally toothed annular clutches 136 and 137 are preferably carried by in the adjacent end portions of the shafts 67 and 56 for rotation therewith and for axial reciprocation with respect thereto, the aforesaid ends preferably being splined as indicated at 138 and 139 for receiving the respective clutches 136 and 137 thereon. Annular clearance openings 141 and 142 are provided between the clutch teeth 131 and 132 and between the clutch 133 and 134, respectively. The openings 141 and 142 exceed the axial width of the external teeth on the clutches 136 and 137, respectively.

Thus, the clutch 136 is alternatively engageable with the gears 121 and 122 and the clutch 137 is alternatively engageable with the gears 122 and 123. In the particular embodiment of the invention shown, the ratio of the meshed gears 122 and 97 differs from the ratio of the meshed gears 123 and 98 by an amount greater than the maximum ratio difference between the meshed gear sets including the gears 101, 102 and 103 and, as a result, axial shifting of the clutch 137 provides a range shift. The present invention is not limited to range shifting transmissions, however, and it is fully contemplated that, for example, the gear sets including the gears 122 and 123 may have ratios sufficiently closely spaced as to split the ratios between the sets including the gears 101, 102 and 103. On the other hand, if no ratio splitting or range shifting is required, the gear 123 and its countershaft gears 98 and 98a could be eliminated, the clutch 137 then acting only to connect the gear 122 to the output shaft 56.

Figure 3:
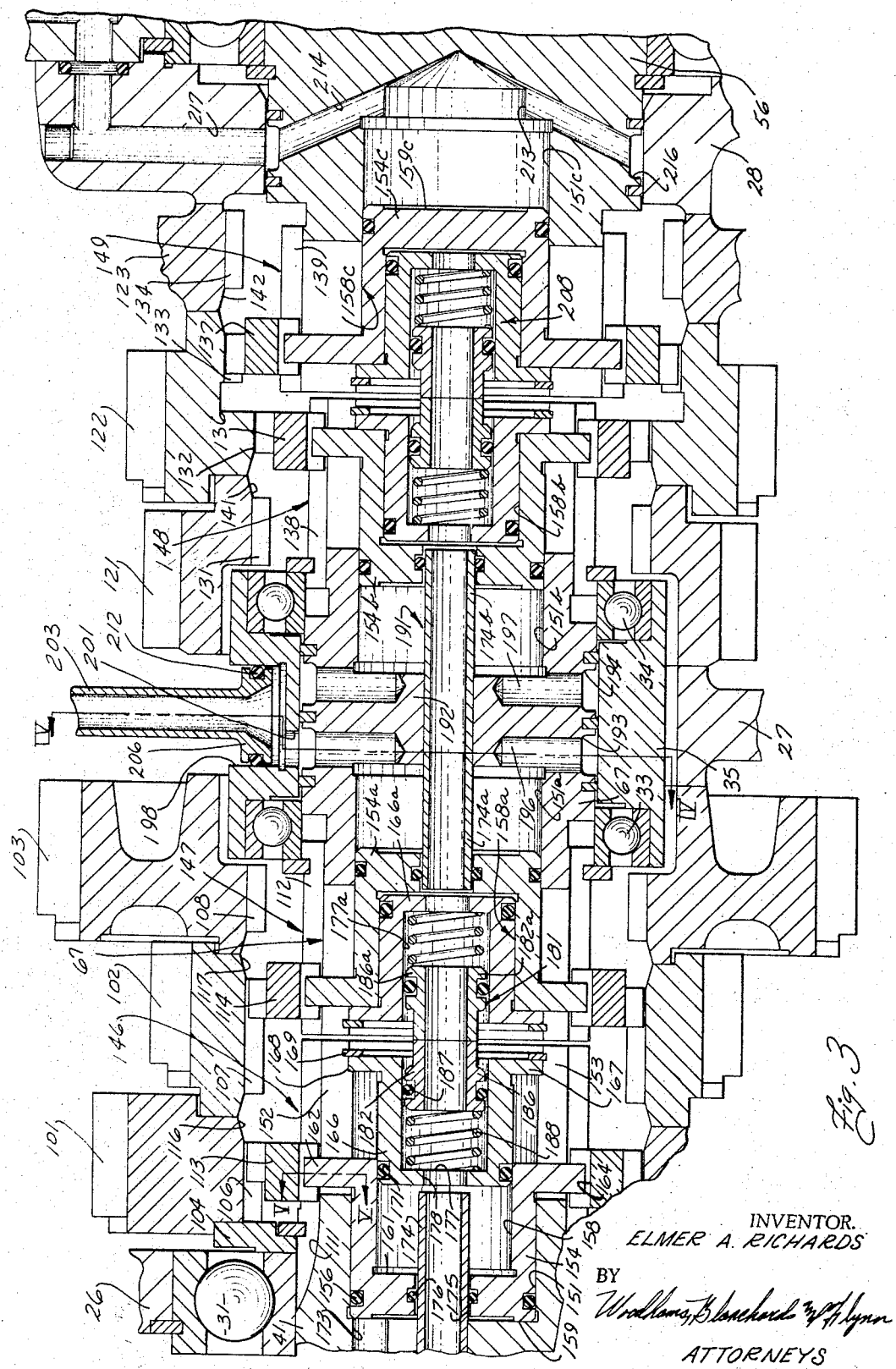
FIGURE 3 is an enlarged fragmentary sectional view substantially taken on the line III—III of FIGURE 2.

Returning to the embodiment shown in FIGURE 3, with clutch 136 in engagement with the clutch teeth 132 of the gear 122 as shown, the direction of rotation of the output shaft 56 and input shaft 41 will be the same. If, on the other hand, the clutch 136 is shifted leftwardly to engage the clutch teeth 131 of the gear 121, the idlers 126 and 127 will reverse the rotation of the output shaft 56 with respect to the input shaft 41.

The clutches 113, 114, 136 and 137 are provided with preferably substantially identical activating systems 146, 147, 148 and 149 respectively. The systems 146 and 147 are located at the adjacent ends of the shaft 41 and 67 and are axially oriented in opposite directions. Similarly, the systems 148 and 149 are located at the adjacent ends of the shafts 67 and 56 and are axially oriented in opposite directions. A description of one of the substantially identical activating systems 146, 147, 148 and 149 will thus suffice for all except as otherwise noted, hereinbelow. Thus, the activating systems 146 associated with the clutch 113 will be described and parts of the remaining systems 147, 148 and 149 will be referred to by the same reference numerals as corresponding parts of the system 146 with the suffixes a, b and c, respectively, added thereto.

Refering now to the activating system 146 (FIGURE 3), a rearwardly facing cylindrical recess 151 is provided in the rearward end of the input shaft 41. A plurality of preferably evenly spaced slots, here a pair of diametrally opposed and axially extending slots 152 (FIGURES 3 and 5) and 153, are disposed in the rearward end of the input shaft 41. The slots 152 and 153 extend forwardy to points intermediate the ends of the cylindrical recess 151. As seen in FIGURE 5 with respect to the slot 152, said slots are located between adjacent spline teeth 111 and extend axially between the roots thereof.

A generally cup-shaped piston 154 is snugly but slidably disposed within the cylindrical recess 151. The piston 154 carries an annular seal, preferably a conventional O-ring seal 156, adjacent its forward end for preventing leakage axially between the walls of the piston and the recess 151. The piston 154 includes a rearwardly opening cylindrical cavity 158, thus the piston defines a forwardly facing radial piston surface 159 and a rearwardly facing radial piston surface 161 of lesser diameter at the forward end of the cavity 158. The piston 154 is provided with a plurality, here a pair, of radially extending ears 162 at the open rearward end thereof. The ears 162 extend snugly but axially slideably outwardly through the slots 152 and 153. The outer ends of the ears 162 extend radially and snugly into circumferential notches 164 (FIGURES 3 and 5) in the opposed ones of the internal spline teeth of the clutch 113. Thus, axial movement of the piston 154 will result in a corresponding axial movement of the clutch 113.

A generally cylindrical pilot member 166 is loosely and coaxially disposed within the recess 151 and includes a radially extending flange 167 on the rearward end thereof. The flange 167 is fixed adjacent the rearward end of the recess 151 between a rearwardly facing shoulder 168 formed in the shaft end and a lock ring 169. The forward end of the pilot member 166 is snugly but slidably received within the rearward end of the cavity 158 of the piston 154 and is provided with a peripheral seal, here an O-ring 171. The recess 151 and flange 167 of the pilot 166 define a closed chamber in which the piston 154 is reciprocable. Thus, as the piston 154 slides rearwardly from its position shown in FIGURE 3, it telescopes over the pilot member 166, the radial wall 161 of the cavity 158 thus moving toward the leftward end of the pilot member. The seal 171 prevents axial leakage past the adjacent surfaces of the pilot 166 and cavity 158. Rearward movement of the piston 154 stops upon contact with the flange 167 of the pilot member 166.

An eccentrically disposed, axial passage 173 communicates with the forward end of the recess 151 for supplying fluid, for example oil, under pressure to the recess 151. Such oil moves the piston 154 rearwardly by applying pressure to the radial face 159 thereof. A conduit 174 is coaxial with the recess 151 and extends rearwardly thereinto and slideably through a coaxial opening 175 in the head of the piston 154 to a point adjacent but spaced ahead of the pilot member 166. A seal, preferably an O-ring 176, is disposed in the opening 175 for preventing leakage of pressure fluid along the conduit 174 between the recess 151 and cavity 158. Means are supplied in association with the cavity 158 for applying a forward or leftward force to the piston 154. This may be done by placing a spring within cavity 158 but it is preferred to provide the conduit 174 for supplying pressure fluid such as oil to the cavity 158 for applying a forward or leftward force upon the surface 161 of the piston 154. Because the face 159 is larger in area than the face 161, the piston 154 will be moved rearwardly in the presence of the same oil pressure in the conduit 174 and passage 173.

The pilot member 166 has a rearwardly facing central recess 177 which communicates through a central opening 178 in the leftward end of the pilot member 166 with the cavity 158 and conduit 174. The forwardly facing central recess 177a in the pilot 166a of the opposed activating system 147 is coaxially aligned with and adjacent to the open rearward end of the central recess 177.

A rotative seal assembly 181 extends between the pilot members 166 and 166a for transferring fluid from the conduit 174 and recess 158 to the recess 158a of the system 147. The rotative seal 181 comprises a pair of preferably identical tubular portions 182 and 182a associated with the systems 146 and 147 respectively. The portion 182 of the rotative seal assembly 181 comprises a substantially cylindrical, annular element 186, the forward end of which is snugly but slideably disposed within the recess 177. The leftward end of the element 186 carries a suitable resilient ring, preferably an O-ring 187, for preventing leakage between the element 186 and the wall of the recess 177. The rightward end of the element 186 extends beyond the end of the shaft 41 and smoothly and continuously abuts the leftward end of the corresponding element 186a of the portion 182a. A compression spring 188 is disposed against the adjacent radial surfaces of the element 186 and recess 177 for urging the element 186 against the similarly but oppositely urged element 186a to prevent radial leakage of fluid therebetween. Thus, pressure fluid from the recess 158 may pass to the recess 158a through the communicating internal opening 181a and 181b of the seal 181 without leakage despite differences of the rotative speed of the shafts 41 and 67.

An elongated conduit 191 (FIGURES 3 and 4) is coaxial with and extends through the central portion 192 of the intermediate shaft 67. The axial ends of the conduit 191, indicated at 174a and 174b, extend coaxially through the recesses 151a and 151b, respectively, and through the radial walls of the pistons 154a and 154b, respectively, in the manner described hereinabove with respect to the conduit 174. The piston 154c differs from the pistons 154, 154a and 154b in that the radial surface 159c thereof has no opening therethrough corresponding to the opening 175 of the piston 154.

A seal assembly 208 preferably identical to the seal assembly 181 is provided between the activating systems 148 and 149.

The central portion 192 of the intermediate shaft 67 is provided with an axially spaced pair of annular grooves 193 and 194 which are connected by the radial passages 196 and 197, respectively, with the closed ends of the recesses 151a and 151b, respectively. A pressure fluid collar 35 is supported by bearings 33 and 34 on and coaxially with shaft 67. Circumferentially spaced and radially outwardly opening inlet ports 198 and 199 (FIGURES 3 and 4) in the collar 35 communicate through respective orifices 201 and 202 with the annular grooves 193 and 194, respectively. Suitable conduits one of which is shown at 203 are each provided with an enlarged head 206 including a resilient annular seal such as an O-ring 212. The heads 206 are received in the ports 198 and 199 in a leakproof manner for supplying fluid such as oil under pressure to the respective recesses 151a and 151b.

The recess 151c of the activating system 149 has a rearward coaxial extension 213 which communicates by means of substantially radially extending passages 214 with an annular groove 216 in the periphery of the output shaft 56. A passage 217 in the web 28 communicates with the groove 216 for supplying same with fluid, preferably oil, under pressure and hence for pressurizing the rear face 159c of the piston 154c to move same forwardly to its position of FIGURE 3.

The passage 173 and conduit 174 may be supplied with pressure fluid by any convenient means. In the particular embodiment shown, the conduit 174 and passage 173 have radial extensions forward of the bearing 31 which communicate radially through a suitable grooved collar 221 (FIGURE 1) pressed into a block 225 fixed with respect to the web 26 and having suitable radial feed passages 222, 223 and 224 therein. If desired, the clutch 38 and/or brake 43 may be actuated by fluid from the passage 224 and lubricated from the passage 222. Passageway 222 also supplies fluid to passageway 174 and passageway 223 supplied fluid to passageway 173. Similarly, the grooved and ported collar 226 between the bearings 22 and 23 may be used to supply pressure fluid for actuating the clutch 61, if desired.

The transmission 10 embodying the invention may be actuated by any convenient means here substantially schematically illustrated by a control box 227 (FIGURE 1). The control box 227 may be supplied with pressure fluid from any convenient source S such as the oil pump of the vehicle engine or a pump on the transmission capable of pumping transmission lubricant. The control box 227 includes a handle 228 which is manually reciprocable between an "engage" position and a "neutral" position. If desired, a foot pedal may be used in place of the handle 228. In the engage position, the halves of the clutches 38 and 61 are engaged and the brake 43 is disengaged whereby the transmission rotates the tail shaft 51 in response to the rotation of its head shaft 36. In the neutral position, on the other hand, the clutches 38 and 61 are disengaged and the brake 43 is engaged to stop rotation of the input shaft and permit stop-synchronized shifting of the transmission. The control box 227 includes a shift selector handle 229 which is manually reciprocable to positions corresponding to each of the forward and reverse gear ratios to be selected. In the particular embodiment shown, the control box 227 is arranged for selecting any of eight forward ratios and one reverse ratio as hereinafter described. The control box 227 is connected by suitable conduits here indicated schematically by the lines 224a, 222a, 223a, 226a, 198a, 199a and 217a to the corresponding passages 224, 222 and 223 in the block 225, the grooved collar 226, the conduits 203 connected to the inlet ports 198 and 199 and the passage 217, respectively. Thus, the control box 227 acts as a set of fluid valves for controlling flow from the source S to the abovementioned conduits.

Operation

Although the operation of the transmission 10 embodying the invention has been indicated somewhat hereinabove, the same will now be summarized to assure a complete understanding of the invention.

Considering first the operation of the activating system 146 (FIGURE 3), same is normally continuously supplied with fluid under pressure from the conduit 174 which fills the cavity 158 and due to the pressure on the radial wall 161 urges the piston into its leftwardmost position shown in FIGURE 3. Thus, the clutch 113 is normally maintained in its leftwardmost position whereat it engages the input shaft 41 to the gear 101.

To disengage the input shaft 41 from the gear 101 and engage it instead with the gear 102, the piston 154 and thereby the clutch 113, is shifted rightwardly from its position shown. This is accomplished by pressurizing the passage 173 and, hence, the portion of the recess 151 to the left of the piston 154 whereby such pressure causes a rightward force on the radial face 159 of the piston. With the pressure in the passage 173 substantially equal to that in the conduit 174, the forces exerted on the radial piston faces will be substantially proportional to the areas thereof. Thus, since the area of the face 159 exceeds the area of the face 161, the rightward force on the piston will exceed the leftward force thereon and the piston 154 will move rightwardly from its position shown to abut the flange 167 of the pilot member 166.

Considering the operation of the other activating systems 147, 148 and 149, pressure fluid from the conduit 174 flows into and through the seal assembly 181 for feeding the cavity 158a of the activating system 147. Thus, in the absence of a corresponding fluid pressure in the recess 151a, the piston 154a is urged rightwardly from its position shown into contact with the rightward end of the recess 151a to cause the clutch 114 to engage the gear 103 to the shaft 67. On the other hand, fluid may be supplied under a corresponding pressure through the conduit 203, port 198, orifice 201, groove 193 and passage 196 to the recess 151a to overcome the opposing force of the fluid on the other end of the piston 154a and force the piston leftwardly to its position shown in the drawing thereby forcing the pressure fluid out of the cavity 158a and back along the line 174. When in its leftwardmost position shown, the piston 154a engages the gear 102 to the forward end of the intermediate shaft 67 by means of the clutch 114.

Pressure fluid from the conduit 174 and seal assembly 181 also flows into the conduit 191 and hence into the recess 158b and seal assembly 208. Thus, the pressure fluid normally continuously supplied by the conduit 191 urges the piston 154b leftwardly and the piston 154c rightwardly from their positions shown in FIGURE 3 for engaging the respective gears 121 and 123 to the respective shafts 67 and 56. On the other hand, pressure fluid may be selectively supplied through the port 199, orifice 202, groove 194 and passage 197 to the recess 151b, preferably substantially at the same pressure as the fluid within the conduit 191, to overcome the force of the latter upon the piston and force the piston 154b rightwardly to its position shown. This causes the clutch 136 to disengage the gear 121 and instead engage the gear 122 to the shaft 67. In a similar manner, the fluid under pressure selectively supplied through the passage 217, groove 216 and passage 214 to the recess 151c, preferably at substantially the same pressure as the fluid in the recess 158c, forces the piston 154c forwardly to its position shown in the drawing, whereby the clutch 127 disengages the gear 123 and instead engages the gear 122 to the shaft 56.

To briefly follow a typical sequence of upshifting operations in the transmission 10, the handle 228 of the control box 227 may be shifted to neutral whereby to release the clutches 38 and 61 and to engage the brake 43 thereby stopping the input shaft 41 through connection of the input shaft 41 by the clutch 113 therewith, the countershafts, intermediate and output shafts and the gears thereof are also stopped.

The shift lever 229 may now be moved to the position corresponding to the gear ratio which is desired, for example, first gear. In the particular transmission shown, the first gear results from the combination of the greatest torque multiplying ratio in the forward zone 29 and the low range of the range shifting gears 122 and 123 of the rearward gear zone 30. More particularly, the first gear of the transmission 10 requires connection of the gear 102 to the input shaft 41 and connection of the gears 103 to the intermediate shaft 67 to effect the lowest speed output of the forward zone 29 as well as connection of the gear 122 to the rearward end of the intermediate shaft 67 and connection of the gear 123 to the output shaft 56 to place the rearward zone 30 in low range. Thus, in first gear, torque is transferred from the input shaft 41 through the gears 102, the forward countershafts and the gear 103 to the intermediate shaft 67. The intermediate shaft 67 then transmits the torque through the gear 122, the rearward countershafts and the gear 123 to the output shaft 56. The gears may be shifted in the manner above described by pressurizing the passages 173 and 197 in addition to the normally continuously pressurized conduit 174.

After shifting the brake 46 may be released and the clutches 38 and 61 engaged by movement of the handle 228 from the neutral position to the engaged position whereafter rotation of the head shaft 36 will be transferred through the transmission 10 to the tail shaft 51 with the proper torque multiplication.

The transmission may be shifted to second gear in a substantially similar manner by placing the lever 228 in neutral and moving the shift handle 229 to the second gear position. In the particular transmission shown, the change from first to second gear is achieved by disengaging the gear 102 from the input shaft 41 and in its stead engaging the gear 101, the same being accomplished by relieving the pressure in the passage 173 whereby the pressure in the conduit 174 will cause the piston 154 to move the clutch 113 away from the gear 102 into engagement with the gear 101. After the shift lever 29 has effected the shift to second gear, the handle 228 is returned to its engaged position for releasing the brake 43 and engaging the clutches 38 and 61 and, hence, for connecting the head and tail shafts. In the following description of further shifting of the transmission, it will be noted without further discussion that in each shift the lever 228 is moved to its neutral position before the shift lever 229 is shifted and that re-engagement of the head and tail shafts occurs after the completion of the shift and the return of the handle 228 to its engaged position.

In shifting from second gear to third gear position, the conduit 203 and the passage 173 are pressurized for causing clutching of both the shafts 41 and 67 to the gear 102 and releasing said shafts from the gears 101 and 103. Thus, third gear is here a direct connection to the shafts 41 and 67.

The shift to fourth gear is accomplished by depressurizing the passage 173 and thereby clutching the gear 101 to the shaft 41 and releasing the gear 102 therefrom. Thus, fourth gear here includes an overdrive gear ratio between the shafts 41 and 67.

Movement of the handle 229 from fourth to fifth gear position causes a range shift from low range to high range in the rear zone 30. More particularly, selection of fifth gear pressurizes the passage 217 and causes the output shaft 56 to disengage the gear 123 and in its stead engage the gear 122. Thus, the clutches 136 and 137 effect a direct drive between the shafts 67 and 56 which is maintained while the transmission 10 is in fifth, sixth, seventh or eighth gear. At the same time, the clutches 113 and 114 are returned to their first gear positions. Thus, the pattern of engagement of the gears 101, 102 and 103 for fifth through eighth gears corresponds to their pattern in first through fourth gears above described.

Movement of the handle 229 to the reverse gear position, in the particular embodiment shown, depressurizes the passage 217 and port 199. As a result, the gear 121 is clutched to the shaft 67 and the gear 123 is clutched to the shaft 56. The gear 121 drives the rearward countershafts 81 and 82 through the reverse idler gears 126 and 127 thereby causing the direction of rotation of the output shaft 56 to be reversed from that of the input shaft 41. The gears 101, 102 and 103 are normally clutched to the shafts 41 and 67 in the same pattern which is followed in the first forward gear described hereinabove. Although in the particular embodiment shown, the control box 227 is arranged to provide only one reverse gear ratio, the transmission 10 itself is able to provide up to eight reverse gear ratios since, as above described, four ratios are obtainable in the forward zone and a range shift is available in the rearward zone by alternative engagement of the clutch 137 with the gears 122 and 123.

Downshifting of the transmission from eighth gear to first gear is accomplished by reversal of the pattern indicated above for upshifting. Thus, a typical downshift is accomplished by moving the handle 228 to neutral, moving the handle 229 to the gear position desired and replacing the handle 228 in its engaged position.

Although a particular preferred embodiment of the invention has been disclosed hereinabove for purposes of illustration, it will be apparent that variations or modifications thereof which lie within the scope of the appended claims are fully contemplated.

The embodiments of the invention in which an exclusive property or privilege is claimed are defined as follows:

1. In a ratio-changing transmission, the combination comprising:
   a rotatable shaft;
   an axially extending opening in said shaft;
   piston means slideable axially of said shaft in said opening, said piston means connected to said shaft for rotation therewith;
   means for applying fluid under pressure to said piston means for moving same axially within said opening;
   ratio means encircling said shaft;
   means movable in response to said piston means for engaging said ratio means to said shaft for rotation therewith.

2. In a ratio-changing transmission, the combination comprising:
   a shaft and means for rotatably mounting said shaft;
   a central opening in said shaft;
   a piston slideable axially of said shaft in said central opening and associated with said shaft for rotation therewith;
   at least one slot in said shaft communicating with said central opening;
   an element projecting radially from said piston extending into each said slot;
   ratio means encircling said shaft;
   clutch means in engagement with said element and axially movable with respect to said shaft by said element for engaging said ratio means to said shaft for rotation therewith.

3. In a ratio changing transmission, the combination comprising:
   a rotatable shaft;
   an opening in said shaft;
   cup-shaped piston means slideable axially of said shaft in said opening;
   means for applying fluid under pressure to said cup-shaped piston means for moving same axially;
   ratio means encircling said shaft;
   means projecting radially from said cup-shaped piston means and movable therewith for engaging said ratio means to said shaft for rotation therewith.

4. In ratio changing transmission, the combination comprising:
   a shaft and means for rotatably mounting said shaft;
   a central opening in said shaft;
   a cup-shaped piston slideable axially of said shaft in said central opening and rotatable therewith;
   means for applying fluid under pressure to said piston for moving same axially of said shaft;
   at least one slot in said shaft communicating with said central opening;
   an element projecting radially from the rim of said cup-shaped piston extending into each said slot;
   ratio means encircling said shaft;
   clutch means in engagement with said element axially movable with respect to said shaft by said element for engaging said ratio means to said shaft for rotation therewith.

5. The transmission defined in claim 4 in which:
   said clutch means comprises an annular clutch supported on said shaft for rotation therewith;
   said element comprises a radially extending arm fixed to said clutch.

6. In a ratio changing transmission, the combination comprising:
   a shaft and means for rotatably mounting said shaft;
   a recess in said shaft;
   a piston slideable axially of said shaft in said recess and rotatable therewith;
   force exerting means for normally continuously urging said piston in one axial direction;
   fluid pressure means actuable for applying fluid under pressure to said piston for moving same axially in a direction opposite said one direction;
   at least one slot in said shaft communicating with said recess;
   an element on said piston extending into each of said slots;
   gear means encircling said shaft;
   clutch means axially movable with respect to said shaft by said element for engaging said gear means to said shaft for rotation therewith.

7. The transmission defined in claim 6 in which:
   said piston has oppositely facing radial faces of differing area;
   said force exerting means normally continuously applies fluid under pressure to the smaller of said radial faces and said fluid pressure means applies said fluid to the larger of said radial faces;
   whereby when the pressure applied to said radial faces is equal, said piston will be forced in said one direction.

8. In a ratio changing transmission, the combination comprising:
   a shaft and means for rotatably mounting said shaft;
   an axial recess in said shaft having an open end and a closed end;
   a pilot member fixed with respect to said shaft, extending into said recess and closing the open end thereof;
   a generally cup-shaped piston slideable in said recess and telescoped over said pilot member;
   means for continuously applying an expanding force between said piston and the closed end of said recess;
   means actuable for supplying fluid under pressure between said piston and said pilot;
   at least one slot in said shaft communicating with said recess;

an element on said piston extending into each of said slots;

gear means encircling said shaft;

clutch means axially movable with respect to said shaft by said element for engaging said gear means to said shaft for rotation therewith.

9. In a ratio changing transmission, the combination comprising:

a plurality of axially aligned shafts;

gear means encircling said shafts;

clutch means slideable on said shafts for alternatively engaging ones of said gear means to said shafts;

means defining chambers in the opposed ends of said shafts;

pistons reciprocable in said chambers and means connecting said pistons to said clutch means for actuating said clutches;

conduit means extending axially through at least the intermediate ones of said pistons for supplying the outer ends of said chambers with pressure fluid;

seal assembly means between the ends of said shafts for connecting the outer ends of said chambers;

means for selectively supplying the inner ends of said chambers with pressure fluid.

10. The transmission defined in claim 9 in which:

said seal assembly means includes a coaxially aligned and axially abutting pair of hollow cylindrical elements, each of said elements being mounted for rotation with a different one of an axially opposed pair of said shafts, resilient means for axially urging said elements against each other and means for allowing communication between said elements and said conduits.

11. A stop-synchronized transmission, comprising in combination:

a case;

a coaxially aligned headshaft and tailshaft and at least a pair of further shafts coaxially aligned therebetween and means for rotatably supporting said shafts with respect to said case;

a first clutch unit actuable for connecting said headshaft and the adjacent one of said further shafts;

a second clutch unit actuable for connecting said tailshaft and the other of said further shafts;

a brake actuable for stopping at least one of said further shafts;

a plurality of main gears encircling said further shafts;

at least one countershaft and gears on said countershaft in mesh with corresponding ones of said main gears;

clutch means actuable for engaging selected ones of said main gears to said further shafts;

means defining pressure fluid cylinders within the adjacent ends of said further shafts in one to one correspondence with said clutch means and means for actuating said clutch means in response to the condition of the one of said pressure fluid cylinder corresponding thereto.

12. The transmission defined in claim 11 in which there is one main gear encircling one of said further shafts, a second main gear encircling the other of said further shafts and a third main gear encircling both of said further shafts;

in which one clutch means is alternatively actuable for engaging said first and second main gears to said further shaft and another clutch means is actuable for alternatively engaging said second and third main gears to said other further shaft.

13. The transmission defined in claim 11 in which there are three axially aligned further shafts, a first set of at most three main gears associated with a first adjacent pair of said further shafts and a second set of at most three main gears associated with the second adjacent pair of said further shafts and at least one countershaft associated with each set of main gears.

References Cited

UNITED STATES PATENTS

| | | | |
|---|---|---|---|
| 2,653,690 | 9/1953 | Saracchi | 74—340 |
| 2,690,681 | 10/1954 | Kiechle | 74—372 |
| 3,105,395 | 10/1963 | Perkins | 74—745 |
| 3,253,475 | 5/1966 | Papst | 74—364 |

DONLEY J. STOCKING, *Primary Examiner.*

H. S. LAYTON, *Assistant Examiner.*